(12) United States Patent
Shaum

(10) Patent No.: US 7,656,661 B2
(45) Date of Patent: Feb. 2, 2010

(54) ELECTRONIC APPARATUS WITH MULTIPLE DATA INPUT MODES

(76) Inventor: Donald Shaum, 59274 County Road 11, Elkhart, IN (US) 46517

( * ) Notice: Subject to any disclaimer, the term of this patent is extended or adjusted under 35 U.S.C. 154(b) by 295 days.

(21) Appl. No.: 11/831,106

(22) Filed: Jul. 31, 2007

(65) Prior Publication Data

US 2009/0034173 A1 Feb. 5, 2009

(51) Int. Cl.
*G06F 1/16* (2006.01)
(52) U.S. Cl. .................................. 361/679.55
(58) Field of Classification Search ............ 361/679.02, 361/679.55
See application file for complete search history.

(56) References Cited

U.S. PATENT DOCUMENTS

| | | | |
|---|---|---|---|
| 5,103,376 A * | 4/1992 | Blonder ................. | 361/679.09 |
| 5,594,619 A | 1/1997 | Miyagawa et al. | |
| 5,987,704 A | 11/1999 | Tang | |
| 6,259,597 B1 * | 7/2001 | Anzai et al. ............ | 361/679.55 |
| 6,262,885 B1 * | 7/2001 | Emma et al. ........... | 361/679.05 |
| 6,275,376 B1 | 8/2001 | Moon | |
| 6,587,333 B2 | 7/2003 | Tseng et al. | |
| 6,680,845 B2 | 1/2004 | Agata et al. | |
| 6,700,773 B1 | 3/2004 | Adriaansen et al. | |
| 6,771,494 B2 | 8/2004 | Shimano | |
| 6,847,520 B2 | 1/2005 | Hashimoto | |
| 6,850,407 B2 | 2/2005 | Tanimoto et al. | |
| 6,900,891 B2 | 5/2005 | Kopelman et al. | |
| 6,944,012 B2 | 9/2005 | Doczy et al. | |
| 6,999,802 B2 | 2/2006 | Kim | |
| 7,006,853 B2 | 2/2006 | Kang et al. | |
| 7,010,834 B2 | 3/2006 | Barnett | |
| 7,016,183 B2 | 3/2006 | Takemoto et al. | |
| 7,017,235 B2 | 3/2006 | Lu et al. | |
| 7,027,297 B1 | 4/2006 | Mizuno et al. | |
| 7,047,598 B2 | 5/2006 | Huang | |
| 7,096,540 B2 | 8/2006 | Watanabe et al. | |
| 7,113,395 B2 | 9/2006 | Hara et al. | |
| 7,133,280 B2 | 11/2006 | Love | |
| 7,136,687 B2 | 11/2006 | Chang | |
| 2004/0066614 A1 * | 4/2004 | Hong ......................... | 361/683 |
| 2004/0227045 A1 | 11/2004 | An et al. | |
| 2005/0060843 A1 | 3/2005 | Hung | |
| 2005/0155184 A1 | 7/2005 | Kayl | |

(Continued)

*Primary Examiner*—Lisa Lea-Edmonds
(74) *Attorney, Agent, or Firm*—Brinks Hofer Gilson & Lione

(57) ABSTRACT

An electronic apparatus that includes a display panel having opposite sides with a display screen provided on one side, a main body enclosure having opposite sides with a key-based input device provided on one side and a keyless user interface provided on an opposite side, and a hinge assembly which couples the display panel and main body member together. The hinge assembly is configured to allow the main body enclosure and the display panel to pivot together about an angle of up to substantially 360° about a common or parallel pivot axes and which hinge assembly further allows the main body enclosure to twist or rotate with respect to the display panel about an axis that intersects or bisects the common or parallel pivot axes about which the main body enclosure and the display panel to pivot. In further embodiments the hinge assembly is further configured to allow the display panel to twist or rotate with respect to the main body enclosure about an axis that intersects or bisects the common or parallel pivot axes about which the main body enclosure and the display panel to pivot.

20 Claims, 7 Drawing Sheets

U.S. PATENT DOCUMENTS

| | | |
|---|---|---|
| 2006/0007648 A1 | 1/2006 | Wang |
| 2006/0111160 A1 | 5/2006 | Lin et al. |
| 2006/0135225 A1 | 6/2006 | Lin et al. |
| 2006/0230580 A1 | 10/2006 | Watanabe et al. |
| 2006/0238970 A1 | 10/2006 | Ukonaho et al. |
| 2007/0086155 A1 | 4/2007 | Chen et al. |
| 2007/0091553 A1 | 4/2007 | Chang |

* cited by examiner

ELECTRONIC APPARATUS WITH MULTIPLE DATA INPUT MODES

TECHNICAL FIELD

The present invention is directed to portable electronic apparatus such as computers, personal digital assistants, wireless phones, digital cameras, hand held video and computer games and gaming devices, or the like that have displays and are foldable by means of hinged structures. More specifically, the present invention is directed to portable electronic apparatus that include multiple data input modes.

BACKGROUND ART

As portable computers have become more integrated in our daily lives, consumer demand has prompted an evolution towards increased flexibility. One relatively recent adaptation has been the development of alternative modes of data input, such as digitizers, to replace or augment the use of conventional alphanumeric keyboards. Digitizers have been adapted for computing devices to allow for, among other things, handwritten user input.

The advent of the digitizer interface has inspired tablet computing devices, including handheld personal digital assistants (PDAs), which are special purpose devices having limited computing power, and larger and more powerful general purpose tablet computers. PDAs and tablet computers provide the practical benefit of being compact when in use, because the display includes a digitizer (i.e., it is a touchscreen) that serves as the input device for receiving information from the user, so that the tablet has a relatively smaller footprint as compared to computers having a separate display and input device. PDAs and tablet computers typically enable the user to write, draw, and navigate using a pen-like stylus.

The implementation of digitizers into portable computers such as notebook, laptop and tablet computers has, for the most part, either replaced alphanumeric keyboards or has incorporated hybrid or integrated display/input devices for standard display screens.

U.S. Pat. No. 7,133,280 to Love, U.S. Pat. No. 7,027,297 to Mizuno et al., U.S. Pat. No. 6,847,520 to Hashimoto, U.S. Pat. No. 6,771,494 to Shimano, U.S. Pat. No. 6,275,376 to Moon and U.S. Pat. No. 5,594,619 to Miyagawa et al. each disclose portable computing devices having hybrid or integrated display/input devices which portable computing devices are configured so that the hybrid or integrated display/input devices can be positioned so as to overlay conventional alphanumeric keyboards.

U.S. Pat. No 6,700,773 to Adriaansen et al. discloses several different configurations for personal computing devices, including an embodiment in FIGS. 13-20 that includes dual digitizers and main body 51 that includes a keyboard 55 on one side and a second digitizer 57 on the opposite side. A system of hinged arms allows each of the panel 53 (containing the first digitizer 61) and main body 51 to rotate about an axis that passes through the panel 53 ("Q") and main body 51 ("S"). The hinged arm are further pivotal about a common axis ("R").

Other U.S. patents and U.S. Application Publications that are directed to related electronic apparatus and devices and hinge configurations and assemblies for such apparatus and devices include U.S. Pat. No. 7,136,687 to Chang, U.S. Pat. No. 7,113,395 to Hara et al., U.S. Pat. No. 7,096,540 to Watanabe et al., U.S. Pat. No. 7,047,598 to Huang, U.S. Pat. No. 7,017,235 Lu et al., U.S. Pat. No. 7,016,183 to Takemoto et al., U.S. Pat. No. 7,010,834 to Barnett, U.S. Pat. No. 7,006,853 to Kang et al., U.S. Pat. No. 6,999,802 to Kim, U.S. Pat. No. 6,944,012 to Doczy et al., U.S. Pat. No. 6,900,891 to Kuivas et al., U.S. Pat. No. 6,850,407 to Tanimoto et al., U.S. Pat. No. 6,680,845 to Agata et al., U.S. Pat. No. 6,587,333 to Tseng et al., and U.S. Pat. No. 5,987,704 to Tang, and U.S. Patent Application Publication Nos. 2007/0086155 to Chen et al., 2007/0091553 to Chang, 2006/0238970 to Ukonabo et al., 2006/0230580 Watanabe et al., 2006/0135225 to Lin et al., 2006/0111160 to Lin et al. 2006/0007648 to Wang, 2005/0155184 to Kayl, 2005/0060843 to Hung, and 2004/0227045 to An et al.

The present invention provides an electronic apparatus with multiple data input modes that can be in the form of a laptop or notebook computer, a subnotebook computer, a personal digital assistant, a wireless phone, a digital camera, a hand held video or computer game or gaming device, or the like.

DISCLOSURE OF THE INVENTION

According to various features, characteristics and embodiments of the present invention which will become apparent as the description thereof proceeds, the present invention provides an electronic apparatus which includes:

a display panel having opposite sides with a display screen provided on one side;

a main body enclosure having opposite sides with a keybased input device provide on one side and a keyless user interface provided on an opposite side; and a hinge assembly which allows the main body enclosure and the display panel to pivot together about an angle of up to substantially 360° about a common or parallel pivot axes and which hinge assembly further allows the main body enclosure to twist or rotate with respect to the display panel about an axis that intersects or bisects the common or parallel pivot axes about which the main body enclosure and the display panel to pivot.

In further embodiments the hinge assembly also the display panel to twist or rotate with respect to the main body enclosure about an axis that intersects or bisects the common or parallel pivot axes about which the main body enclosure and the display panel to pivot.

The electronic apparatus can be any one of a computer, a personal digital assistant, a wireless phone, a digital camera, and a hand held video or computer gaming device.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
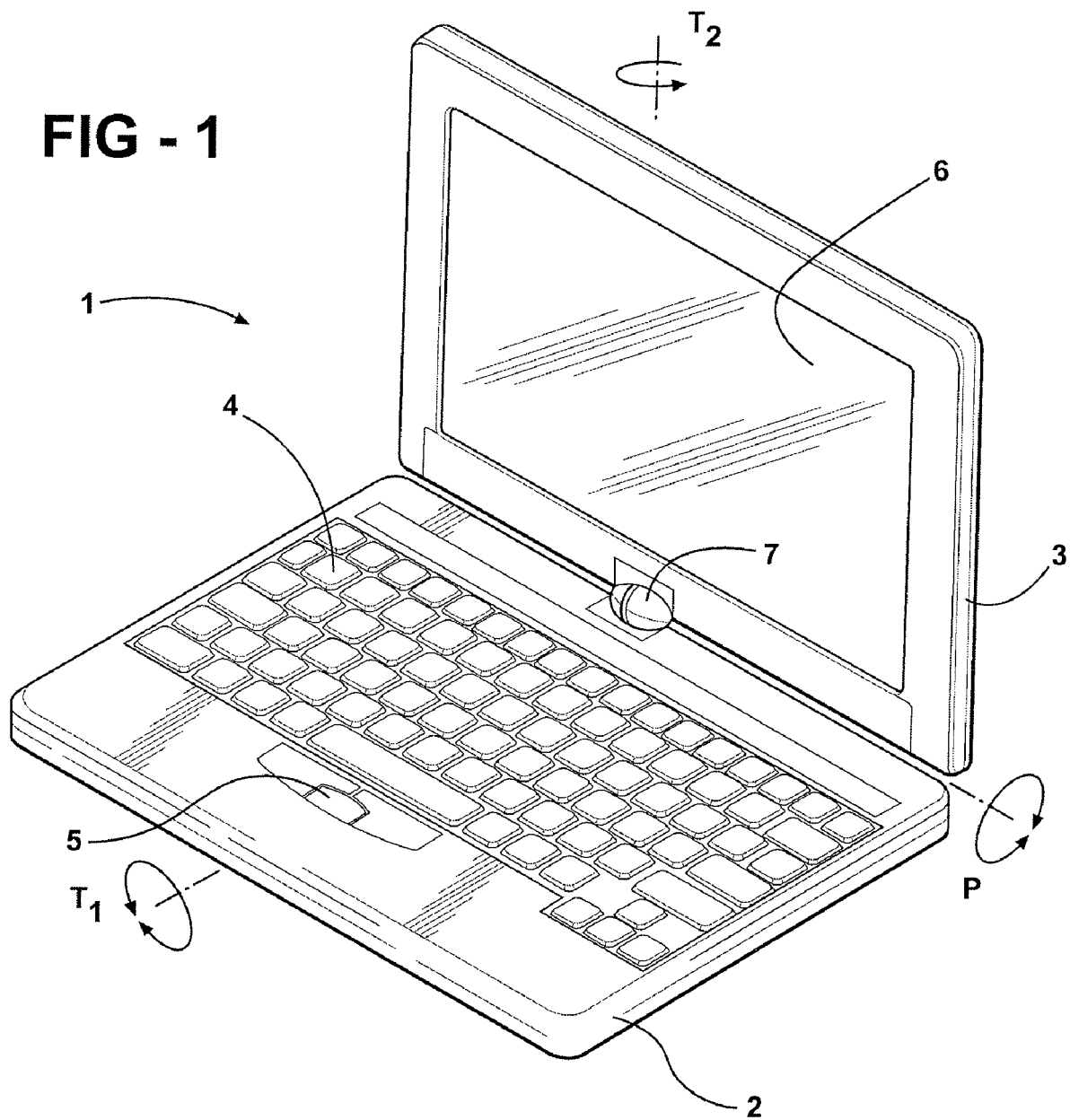
FIG. 1 is a perspective view schematically illustrating the structure of a notebook personal computer as a specific, non-limiting example of an electronic apparatus according to one embodiment of the present invention.

The present invention is directed to portable electronic apparatus such as of computers, personal digital assistants, wireless phones, digital cameras (including digital and video cameras), hand held video games and computer gaming devices, or the like that include displays and are foldable by means of hinged structures and include multiple data input modes. The portable electronic apparatus include main body enclosures and display panels which are coupled together by multi-directional hinge assemblies. The multi-directional hinge assemblies allow the main body enclosures and display panels to tilt with respect to one another and to further twist or rotate with respect to one another.

The display panels include conventional liquid crystal display screens or other flat panel display screens. The main body enclosures contain conventional electronics depending on the type of electronic apparatus. For example, for a personal computer the main body enclosure can contain the processing unit, memory modules, power supply, cooling fans, removable storage device readers/writers, etc. For a wireless phone the main body enclosure can contain the speaker, microphone, signal processor, transmitter, memory, etc. In the case of a personal digital assistant the main body enclosure can contain the processor, storage, power supply, etc. A hand held video game or computer gaming device can include, in addition to internal components such as a processing unit, input devices such as joy sticks or multiple directional toggle switches, inputs to connect with other game systems, etc. These internal components are conventional and their use in these and other electronic apparatus according to the present invention are within the skill of those in the art. Likewise, means to link various system components or multiple electronic devices together including hard wire connections, infrared or radio signaling means, and the like can be incorporated into the electronic apparatus of the present invention, it being understood that this list of components and features is not exhaustive.

The main body enclosures further include a both keyboards and keyless user interfaces which are also referred to herein and commonly known as digitizers or touch screens. For purposes of the present invention the "keyboards" are more generally referred to as key-based input devices which encompasses conventional keyboards as well as and arrangement or combination of keys, pads, buttons, etc., which can be operated to input data, including any number of individual keys, pads, buttons, etc. The digitizers are flat panels upon which a user can input data by writing on the panel with a pen or stylist. Conventional software converts the user's "writings" or drawings into a pattern(s) that is displayed on the display screen that is provided on the display panel. Other types of conventional software allow for manipulation of the user's "writings" or drawings by, for example, recognizing and converting hand written alphanumeric a characters into standard alphanumeric characters that can be displayed and processed in a word processing format, or rendering a drawing multi-dimensional for purposes of manipulating, e.g. viewing the drawing from difference angles or perspectives. Other types of conventional software can also be used according to the present invention.

The keyboards and digitizers are provided on opposite sides or surfaces of the main body enclosures which provides for unique functional abilities as discussed in more detail below.

The present invention will hereafter be described with reference to the attached drawings in which similar reference numerals are used to identify common elements, when possible, for purposes of simplifying the description/disclosure. It is noted that, while the drawings are directed to a personal computer, the present invention is not limited to personal computers. Rather the present invention, which provides for dual modes for inputting data into electronic apparatus, is applicable to all type of computers, including laptop computers, notebook computers, subnotebook computers as well as personal digital assistants, wireless phones, digital cameras, hand held video or computer gaming devices and other electronic apparatus that typically have displays and include or could be adapted to include hinged structures.

FIG. 1 is a perspective view schematically illustrating the structure of a notebook personal computer as a specific, non-limiting example of an electronic apparatus according to one embodiment of the present invention. The personal notebook computer shown in FIG. 1 is generally identified by reference numeral 1 and includes a first enclosure or main body enclosure 2 and a second enclosure or display enclosure or display panel 3 that is coupled to the main body enclosure 2. The main body enclosure 2 and the display panel 3 may be made of conventional materials, including a reinforced resin material such as polycarbonate.

A motherboard is enclosed within the main body enclosure 2. Electronic circuit elements such as a central processing unit, CPU, a memory unit, and the like, are mounted on the motherboard. The central processing unit is designed to execute various processing or calculation based on software programs and/or data temporarily stored in the memory unit. The software programs and data may be stored in a mass storage such as a hard disk drive, HDD, enclosed within the main body enclosure 2.

Input devices such as a keyboard 4, a pointing device 5, mouse pad (not shown) and the like, are located on the first surface of the main body enclosure 2. The keyboard 4 includes keypads that can be arranged in a conventional manner. According to one embodiment of the present invention, a user can utilize the keyboard 4 (and pointing device 5 or mouse pad) to input various instructions and data to the central processing unit.

A flat display screen 6 such as a liquid crystal display (LCD) is incorporated in the display panel 3. The display screen 6 is exposed on the front surface of the display panel 3 as shown. Various texts and/or graphics can be displayed on the display screen 6 in response to the operation of the central processing unit.

A multi-axial hinge assembly 7 is employed to couple the main body enclosure 2 with the display panel 3. The multi-axial hinge assembly 7 allows the main body enclosure 2 and display panel 3 to pivot with respect to one another about a common pivot axis "P" and further allows the main body enclosure 2 to twist or rotate with respect to the display panel 3 and the display panel to twist or rotate with respect to the main body enclosure 2 about axes "$T_2$" and "$T_1$" which extend through the main body enclosure 2 and display panel 3 as shown and intersect at the hinge assembly 7. This configuration allows independent twisting or rotation of each the main body enclosure 2 and the display panel 3. It is noted that while the embodiment shown in FIG. 1 is discussed as having a common pivot axis "P" that allows the main body enclosure 2 and display panel 3 to pivot with respect to one another, its is known and within the scope of the present invention to have the main body enclosure 2 and display panel 3 to pivot with respect to one another about separate parallel pivot axes.

Figure 2:
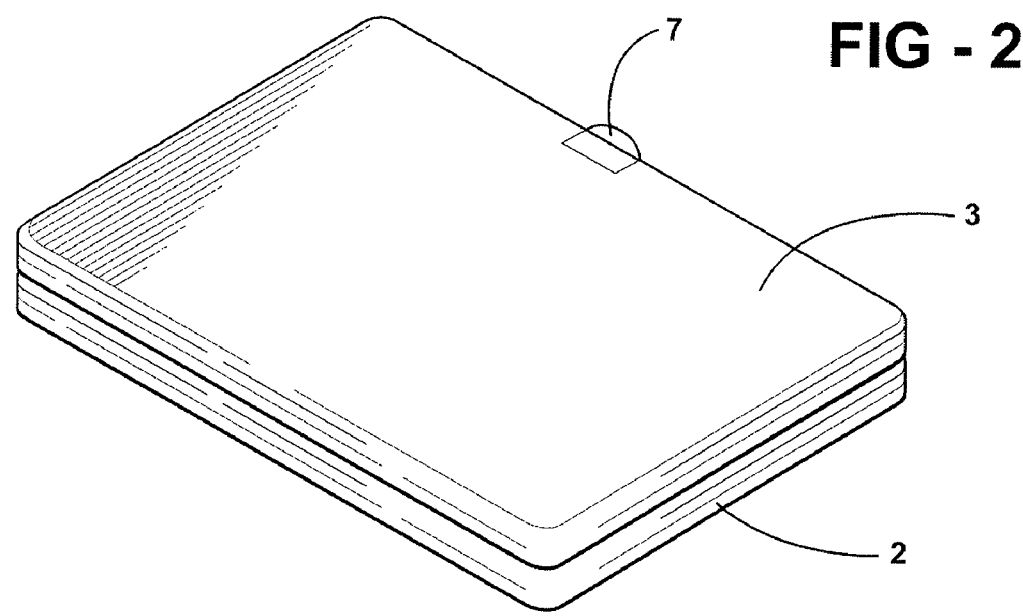
FIG. 2 is a perspective view of the notebook personal computer for schematically illustrating the display panel folded over the upper surface of the main body enclosure with the front surface of the display panel received on the front surface of the main body enclosure.

FIG. 2 is a perspective view of the personal notebook computer of FIG. 1 in a closed configuration in which the display panel is folded over the upper or first surface of the main body enclosure. FIG. 2 depicts the display panel 3 in a position in which the display panel 3 is folded over the upper or first surface of the main body enclosure 2. When the main body enclosure 2 and display panel 3 are folded (pivoted together about axis "P") into the configuration shown in FIG. 2 from the configuration shown in FIG. 1 the display screen 6 faces and is superimposed over keyboard 4 on the main body enclosure 2. In this position/configuration a standard latch assembly (not shown) can be used to secure the personal notebook in its closed position for storage or transportation.

Figure 3:
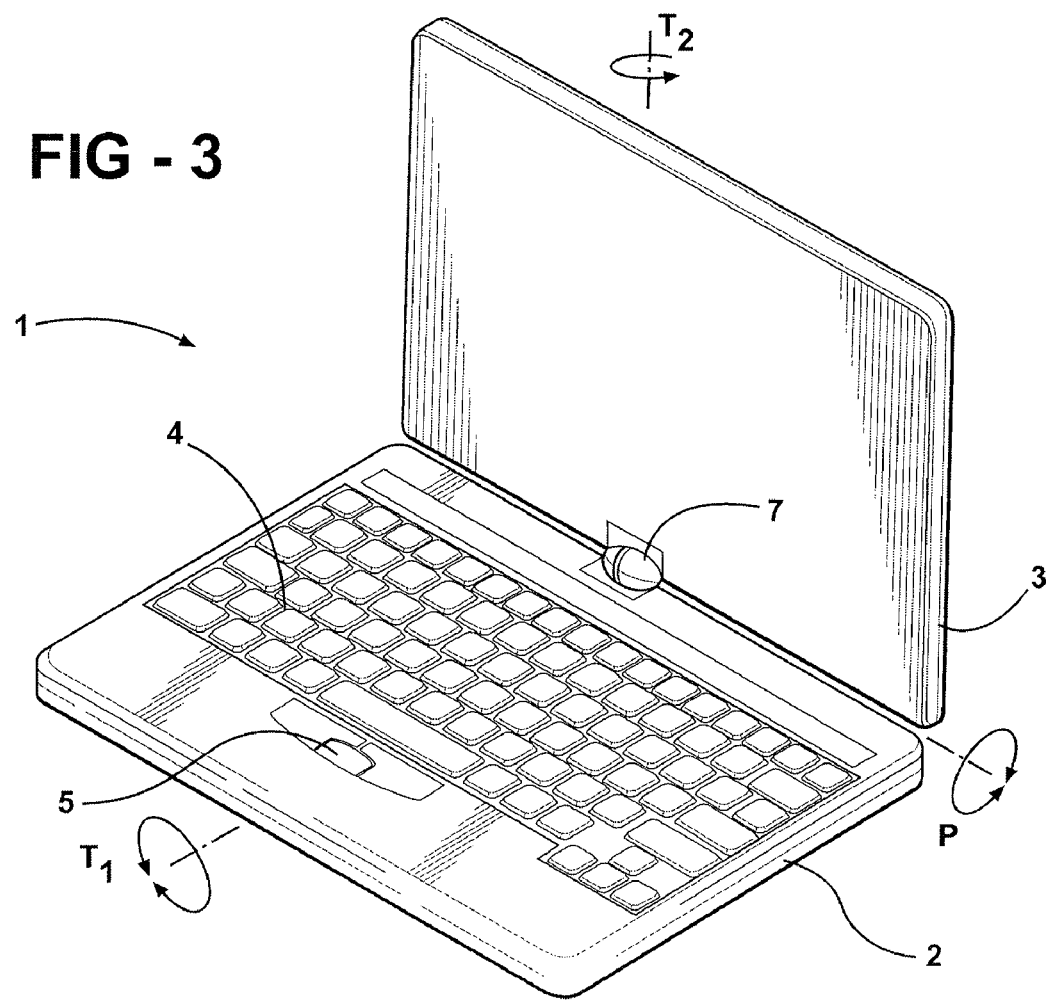
FIG. 3 is a perspective view of the notebook personal computer for schematically illustrating the display panel establishing a second upright attitude around the vertical axis.

FIG. 3 is a perspective view of the personal notebook computer for schematically illustrating the display panel establishing a second upright attitude around the vertical axis. The configuration of the display panel 3 shown in FIG. 3 has been produced by rotating the display panel 3 about axis "$T_2$." More specifically, the display panel 3 has been rotated about axis "$T_2$" from the position or configuration shown in FIG. 1 to the position shown in FIG. 3. The movement of the display panel 3 to change from the position or configuration shown in FIG. 1 to the position shown in FIG. 3 can be referred to as "twisting" (or rotating) the display panel 3 relative to the main body enclosure 2. This type of movement and the specific configuration of the hinge assembly to effect or allow this type of movement are known in the art and discussed in more detail below.

When the personal notebook computer 1 is in the position or configuration shown in FIG. 3, the display screen 6 is viewable from the opposite side of the notebook computer 1 than in the configuration shown in FIG. 1. The ability to rotate or twist the display panel 3 in this manner can be useful when the user wishes to turn the display screen 6 around to let someone else view the display screen 6, as opposed to rotating the entire personal notebook computer 1 around.

Figure 4:
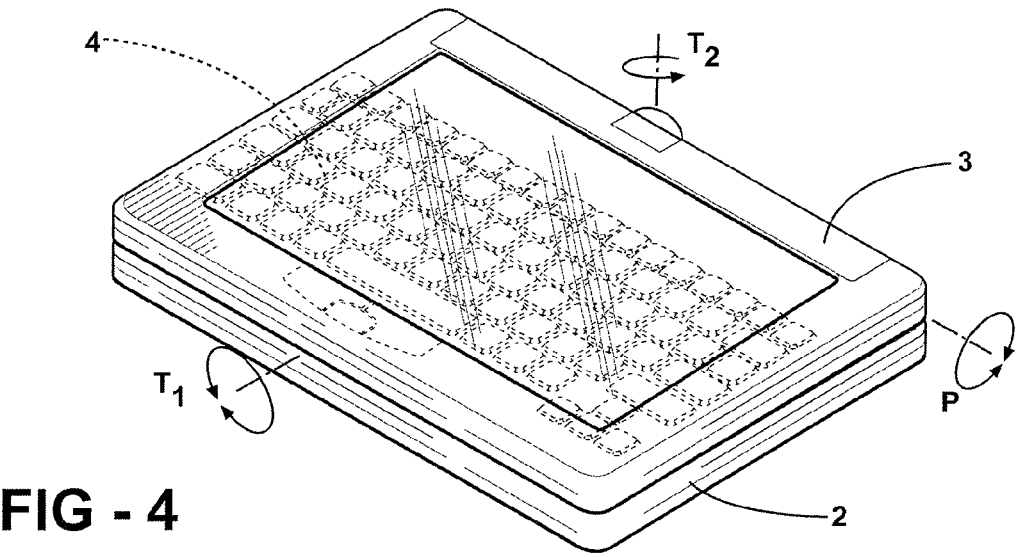
FIG. 4 is a perspective view of the notebook personal computer for schematically illustrating the display panel folded over the main body enclosure with the back surface of the display enclosure received on the front surface of the main body enclosure.

FIG. 4 is a perspective view of the notebook personal computer for schematically illustrating the display panel folded over the main body enclosure with the back surface of the display panel received on the front or first surface of the main body enclosure. The position or configuration of the notebook computer shown in FIG. 4 is achieved by tilting or folding the display panel 3 over the upper or first surface of the main body enclosure 2. When the main body enclosure 2 and display panel 3 are folded (pivoted together about axis "P") into the configuration shown in FIG. 4 from the configuration shown in FIG. 2 the display screen 6 faces upward and can display text and/or graphics that are enter into the central processing unit of the personal notebook computer and processed therein using any conventional operating system and/or software program(s). Such text and/or graphics can be entered into the central processing unit via the keyboard 4 or digitizer 9 (FIG. 5), one of which will accessible on the opposite of exposed side of the main body enclosure 2. A standard latch mechanism (not shown) can be used to secure the personal notebook computer 1 in the position/configuration shown in FIG. 4.

Figure 5:
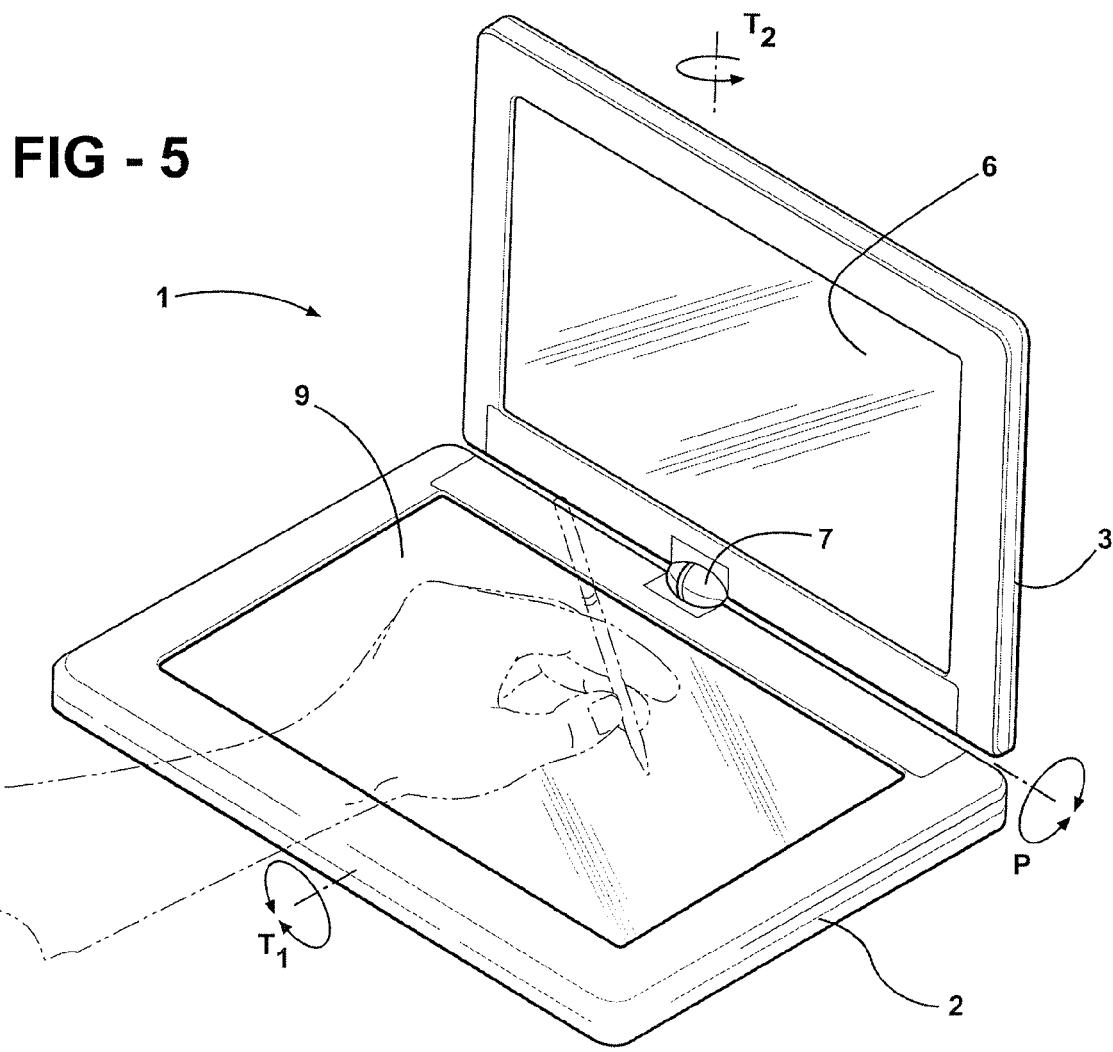
FIG. 5 is a perspective view of the personal notebook computer of FIG. 1 in a position of configuration in which the main body enclosure has been rotated of twisted with respect to the display panel from the position/configuration shown in FIG. 1 so that the digitizer is on the upper surface of the main body enclosure as shown.

FIG. 5 is a perspective view of the personal notebook computer of FIG. 1 in a position or configuration in which the main body enclosure 2 has been rotated of twisted with respect to the display panel 3 from the position/configuration shown in FIG. 1 so that the digitizer 9 is on the upper or surface of the main body enclosure 2 as shown. More specifically, the main body enclosure 2 has been rotated about axis "$T_1$" from the position or configuration shown in FIG. 1 to the position shown in FIG. 5. This position/configuration allows one to enter date (in the form of text or graphics) into the personal notebook computer's processing unit and have the processed data displayed on the display screen 6. This position/configuration provides for some functionality that is unique to the present invention. For example, when using the personal notebook computer 1 on site or in the field, one can "write" notes or sketch drawings or diagrams on the digitizer 9 and immediately view the processed data (on the display screen 6) while the computer can capture the input notes, sketches, drawings, etc. This allows one to confirm the data that can be stored in the memory of the personal notebook computer and transmitted via the internet or wireless LAN to others or to a main computer that collects and stores or processes or correlates the data in some manner or fashion.

In addition, the personal notebook computer 1 shown in FIG. 5 can be laid flat (by pivoting the main body enclosure 2 and/or display panel 3 about axis "P") and positioned so that the display screen 3 and main body enclosure 2 are side-by-side with, for example, the main body enclosure 2 and digitizer 9 on the left-hand side of the display screen 2. In this embodiment/configuration a child learning to write could practice writing letters on the digitizer 9 and view the letters as they are displayed on the adjacent display screen 6.

According to one embodiment of the present invention a standard hinge assembly can be used which allows the main body enclosure 2 to pivot about a common axis ("P" shown in FIG. 1) (or parallel axes) with the display panel 2, and which allows the main enclosure 2 to rotate or twist about an axis ("$T_1$" in FIG. 1) with respect to the display panel 3. Hinge assemblies that provide or allow for such move and associated configurations are well known in the art as exemplified by U.S. Pat. No. 7,027,297 to Mizuno et al., and U.S. Patent Application Publication Nos. 2006/0230580 to Watanabe et al. and 2005/0060843 to Hung, which are expressly incorporated herein by reference, and others. In the case of such known hinge assemblies, they are generally configured to allow the display panels rotate or twist with respect to the main body enclosures. However, for purposes of the present invention, these known hinge assemblies can be incorporated and used to provide for the main body enclosure 2 to rotate or twist with respect to the display panel 3. Such a hinge structure/configuration would allow the person notebook computer described in reference to the drawings to be configured as shown in FIGS. 1, 2 and 5.

Figure 6A:
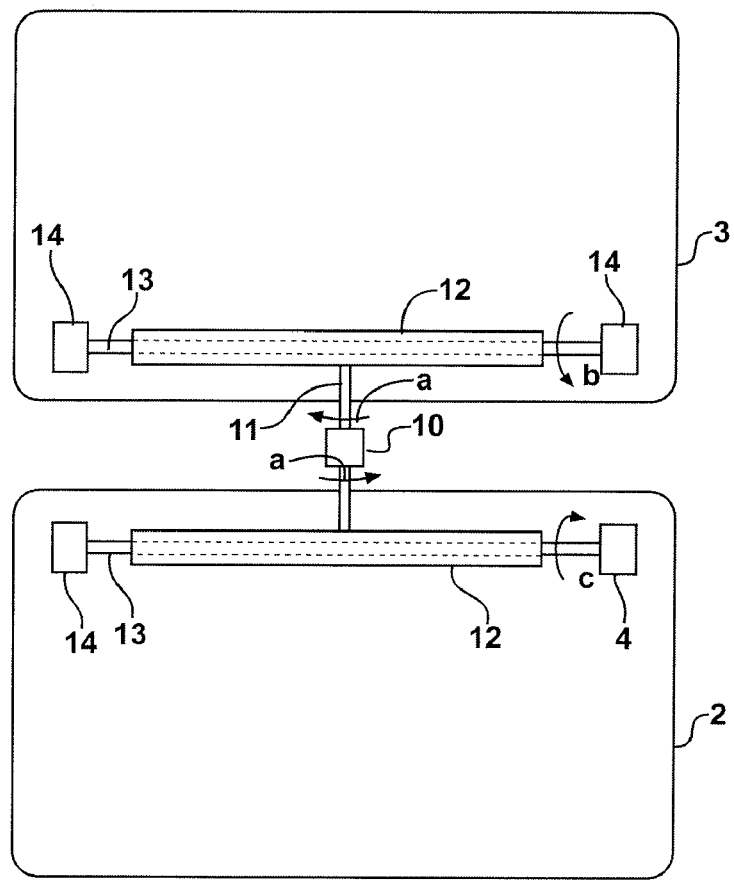
FIG. 6A is a schematic top view of a personal notebook computer illustrating a hinge assembly according to one embodiment of the present invention.
Figure 6B:
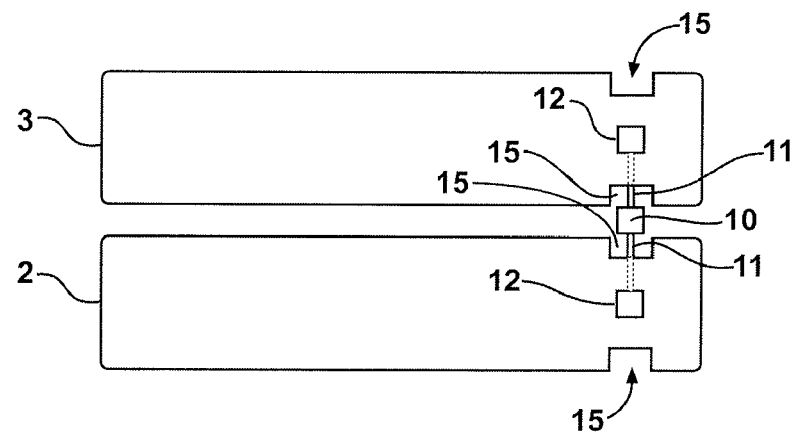
FIG. 6B is a schematic side view a personal notebook computer in a closed position illustrating the hinge assembly of FIG. 6A.
Figure 6C:
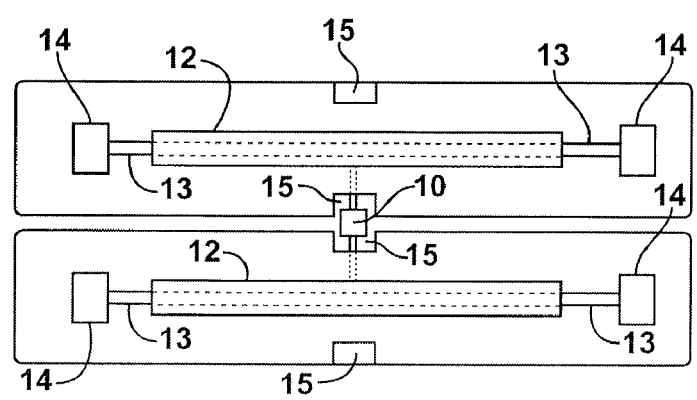
FIG. 6C is a schematic rear view a personal notebook computer in a closed position illustrating the hinge assembly of FIG. 6A.

FIGS. 6A-6C are schematic illustrations of the hinge assembly for another embodiment of the present invention. FIG. 6A is a schematic top view of a personal notebook computer illustrating a hinge assembly. FIG. 6B is a schematic side view a personal notebook computer in a closed position illustrating the hinge assembly of FIG. 6A. FIG. 6C is a schematic rear view a personal notebook computer in a closed position illustrating the hinge assembly of FIG. 6A. The hinge assembly illustrated in FIGS. 6A-6C includes a central rotating block 10 that is coupled to shafts 11 that have opposite ends which are coupled to hinge blocks 12 that are positioned in the main body enclosure 2 and display panel 3. The hinge blocks 12 have shafts 13 passing therethrough which shafts 13 are rotatably supported in the hinge blocks 12 and have opposite ends that are secured to the housings of the main body enclosure 2 and the display panel 3 by hinge supports 14. As indicated by arrows "a" the hinge assembly allows the main body enclosure 2 and the display panel 3 to independently rotate about a common axis that extends through shafts 11. In addition, the hinge assembly allows for the main enclosure body 2 and display panel 3 to independently rotate about an axis that extends through shafts 13 as indicated by arrows "b" and "c." In this manner, the personal notebook computer 1 that is schematically illustrated in FIGS. 6A-6C can be positioned/configured into any of the positions/configurations shown and discussed above in reference to FIGS. 1-5.

In order to provide clearance for the central rotating block 10 of the hinge assembly, the housings of the main body enclosure 2 and the display panel 3 can be configured as depicted in FIGS. 6B and 6C so that recesses 15 are formed in the housings of the main body enclosure 2 and the display panel 2 which will provide clearance for the central rotating block 11 so that the main body enclosure 2 and the display panel 3 can be folded together and closed.

Figure 7A:
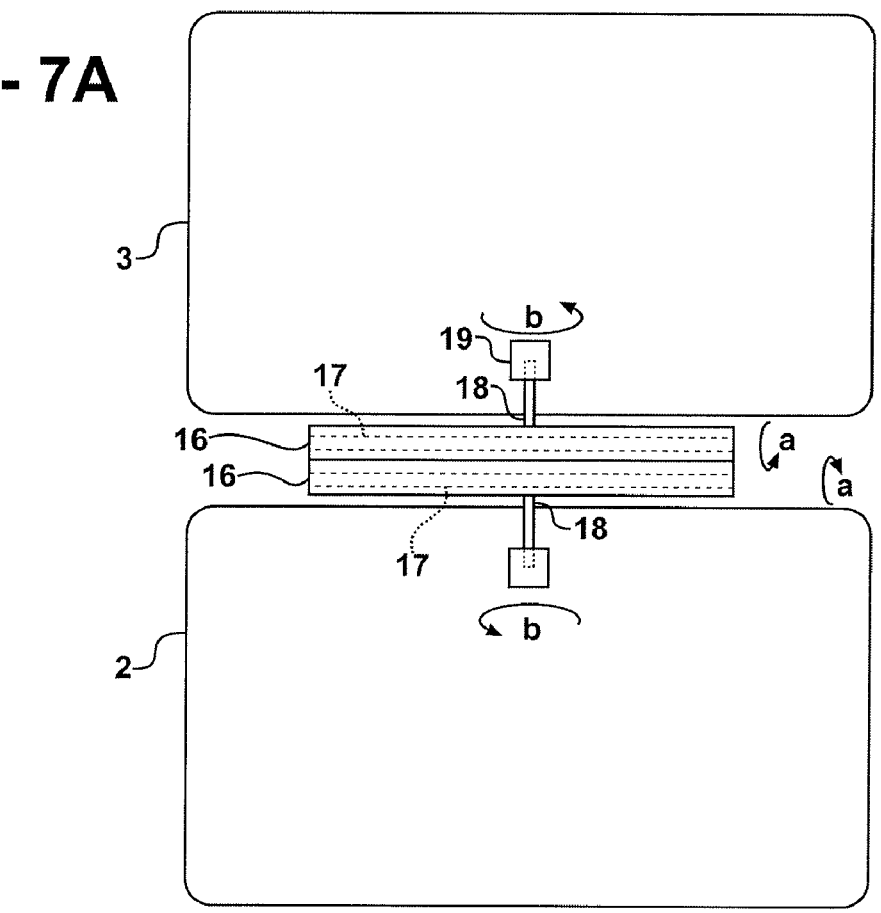
FIG. 7A is a schematic top view of a personal notebook computer illustrating a hinge assembly according to another embodiment of the present invention.
Figure 7B:
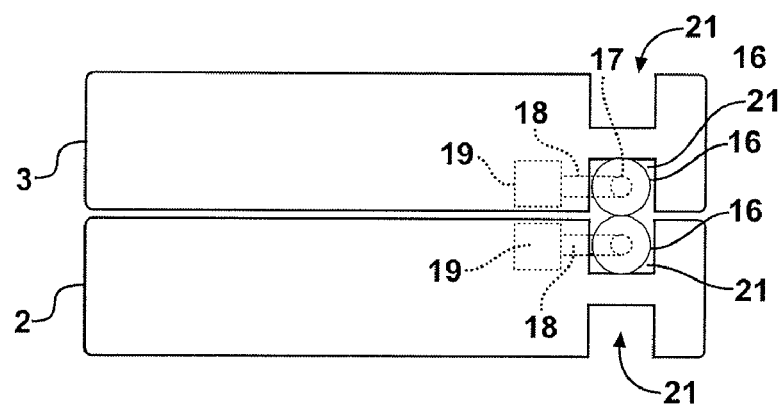
FIG. 7B is a schematic side view a personal notebook computer in a closed position illustrating the hinge assembly of FIG. 7A.
Figure 7C:
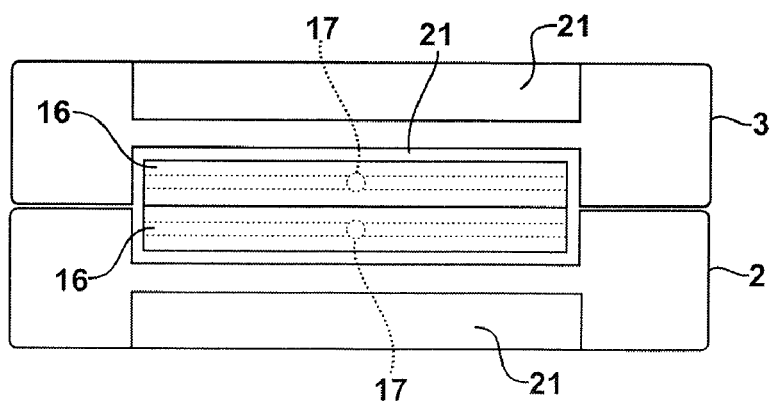
FIG. 7C is a schematic rear view a personal notebook computer in a closed position illustrating the hinge assembly of FIG. 7A.

FIGS. 7A-7C are schematic illustrations of the hinge assembly for another embodiment of the present invention. FIG. 7A is a schematic top view of a personal notebook computer illustrating a hinge assembly. FIG. 7B is a schematic side view a personal notebook computer in a closed position illustrating the hinge assembly of FIG. 7A. FIG. 7C is a schematic rear view a personal notebook computer in a closed position illustrating the hinge assembly of FIG. 7A. The hinge assembly illustrated in FIGS. 7A-7C includes a pair of parallel central hinge blocks 16 that house rotating shafts 17 therein. Coupling shafts 18 which are coupled to shafts 17 extend through the central hinge blocks 16 and into the housings of the main body enclosure 2 and display panel 3. The coupling shafts are received in hinge blocks 19 that are secured to the housings of the main body enclosure 2 and the display panel 9. As indicated by arrows "a" the hinge assembly allows the main body enclosure 2 and the display panel 3 to independently rotate about shafts 17 that are provided in the central hinge blocks 16. In addition, the hinge assembly allows for the main enclosure body 2 and display panel 3 to independently rotate about coupling shafts 18 as indicated by arrows "b." In this manner, the personal notebook computer 1 that is schematically illustrated in FIGS. 7A-7C can be positioned/configured into any of the positions/configurations shown and discussed above in reference to FIGS. 1-5.

In order to provide clearance for the central hinge blocks 16 of the hinge assembly, the housings of the main body enclosure 2 and the display panel 3 can be configured as depicted in FIGS. 7B and 7C so that recesses 21 are formed in the housings of the main body enclosure 2 and the display panel 3 which will provide clearance for the central hinge blocks 16 so that the main body enclosure and the display panel can be folded together and closed.

Figure 8A:
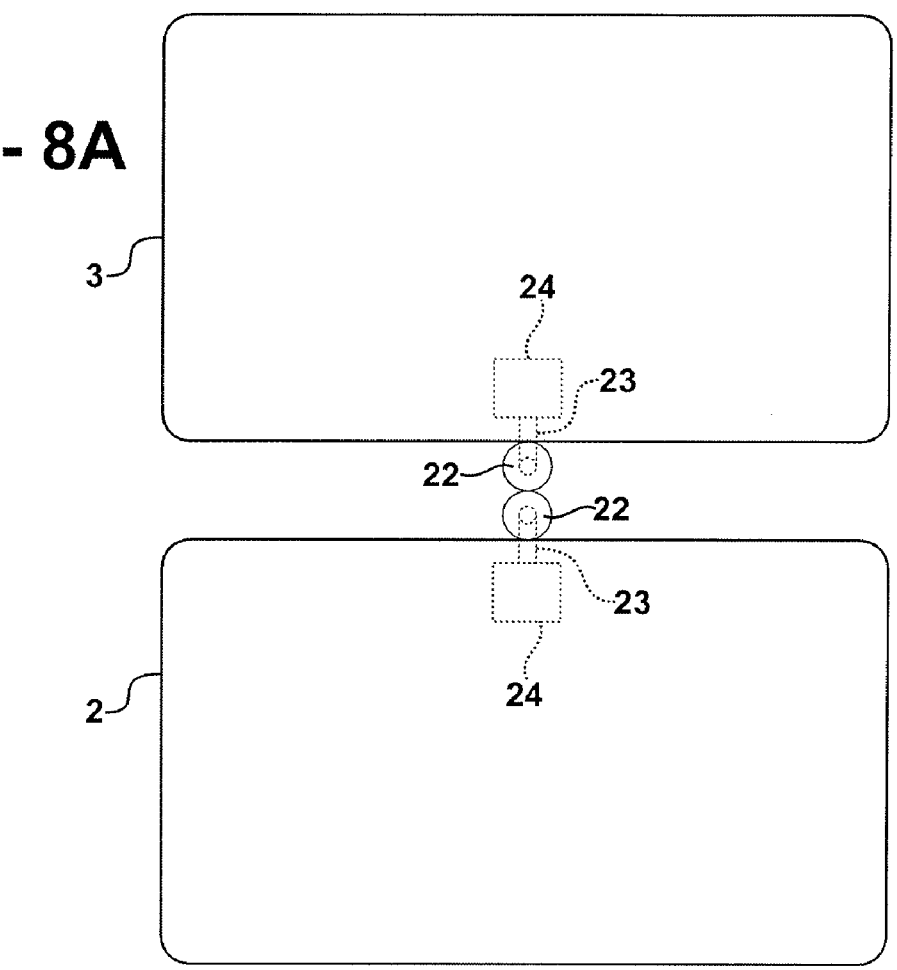
FIG. 8A is a schematic top view of a personal notebook computer illustrating a hinge assembly according to another embodiment of the present invention.
Figure 8B:
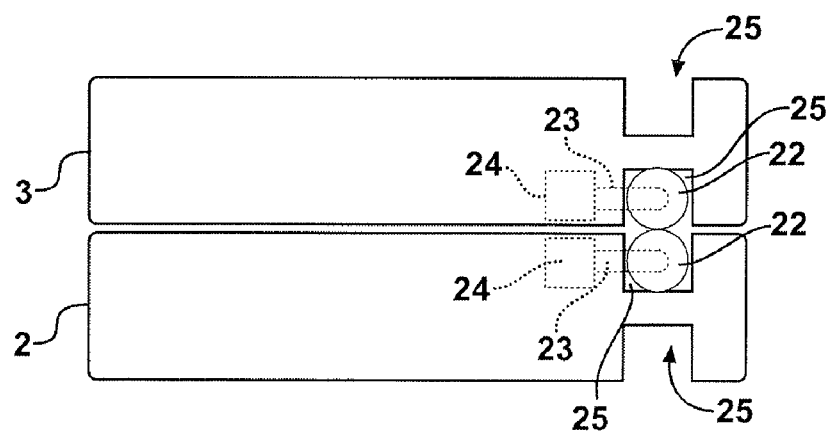
FIG. 8B is a schematic side view a personal notebook computer in a closed position illustrating the hinge assembly of FIG. 8A.
Figure 8C:
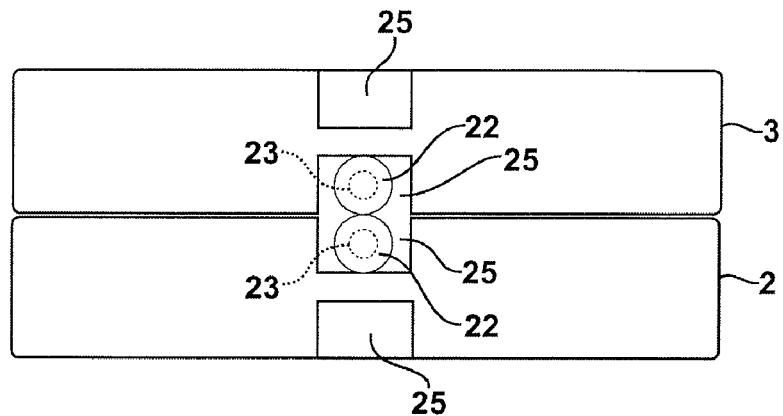
FIG. 8C is a schematic rear view a personal notebook computer in a closed position illustrating the hinge assembly of FIG. A.

FIGS. 8A-8C are schematic illustrations of the hinge assembly for another embodiment of the present invention. FIG. 8A is a schematic top view of a personal notebook computer illustrating a hinge assembly. FIG. 8B is a schematic side view a personal notebook computer in a closed position illustrating the hinge assembly of FIG. 8A. FIG. 8C is a schematic rear view a personal notebook computer in a closed position illustrating the hinge assembly of FIG. A. The hinge assembly illustrated in FIGS. 8A-8C includes a pair of central ball joints 22. Coupling shafts 23 are coupled to the ball joints 22 for multi-axial movement with respect to the ball joints 22. Coupling shafts 23 extend into the housings of the main body enclosure 2 and display panel 3 and are received in hinge blocks 24 that are secured to the housings of the main body enclosure 2 and the display panel 3. As indicated by arrows "a" the ball joints 22 of the hinge assembly allows the main body enclosure 2 and the display panel 3 to independently rotate about the center of ball joints 22. In addition, the main enclosure body 2 and display panel 3 can independently rotate about either the coupling shafts 23 provided in the hinge blocks 24 or about the ball joints 22. In this manner, the personal notebook computer 1 that is schematically illustrated in FIGS. 8A-8C can be positioned/configured into any of the positions/configurations shown and discussed above in reference to FIGS. 1-5.

In order to provide clearance for the ball joints 22 of the hinge assembly, the housings of the main body enclosure and the display panel can be configured as depicted in FIGS. 7B and 7C so that recesses 25 are formed in the housings of the main body enclosure 2 and the display panel 3 which will provide clearance for the ball joints 22 so that the main body enclosure 2 and the display panel 3 can be folded together and closed.

Figure 9:
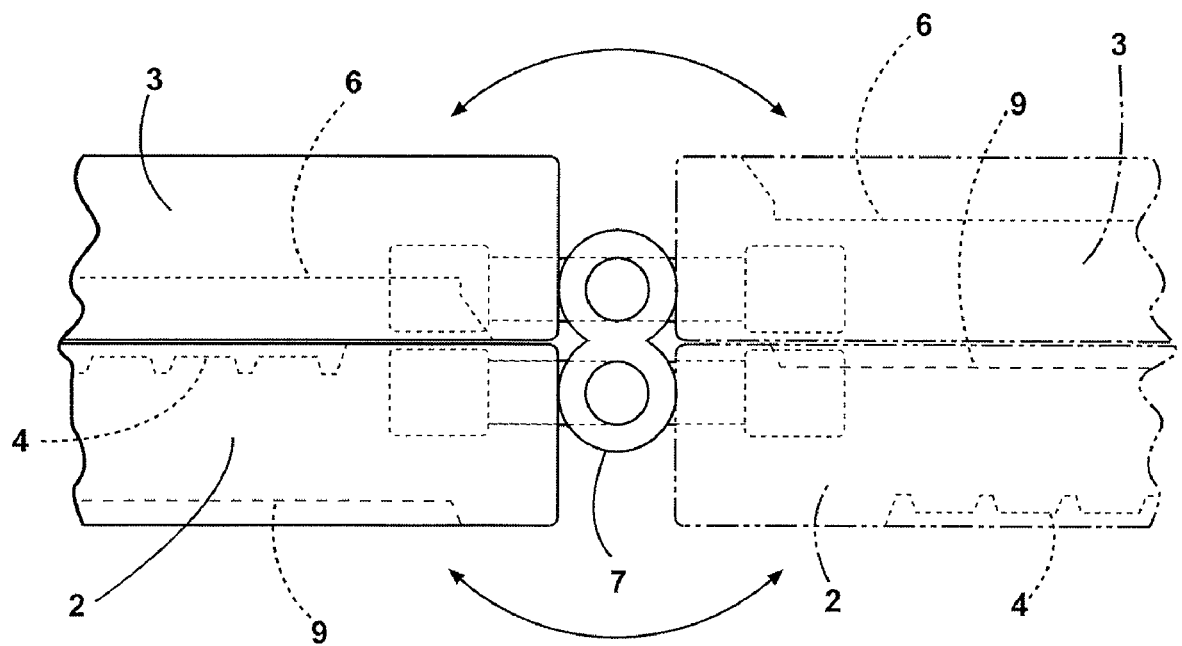
FIG. 9 is a schematic view of a portion of the rear side of a personal computer notebook which illustrates how the hinge assembly will allow the main body enclosure and display panel to fold backward onto one another.

FIG. 9 is a schematic view of a portion of the rear side of a personal computer notebook which illustrates how the hinge assembly will allow the main body enclosure and display panel to fold backward onto one another. The hinge assembly in FIG. 9 is generally identified by reference number 7 and is generally similar to the hinge assemblies depicted in FIGS. 7A-8C. In FIG. 9 it can be understood how, according to one embodiment of the present invention, the display panel 3 can be positioned on the main body enclosure 2 so that the display screen 6 in the display panel 3 faces the keyboard 4 in the main body enclosure 2 (seem on left hand side of drawing). In another configuration, the display panel 3 is rotated clockwise in FIG. 9 and the main body enclosure 2 is rotated counter clockwise so that when the display panel 3 is again positioned on the main body enclosure 2 (see right hand side of drawing), the display screen 6 in the display panel 3 faces upward and the keyboard 4 in the main body enclosure 2 faces downward. The configuration of the main body enclosure 2 and the display screen 3 is illustrated as being changed in FIG. 9 by pivoting the main body enclosure 2 and display panel 3 about axis P (See FIG. 1). The orientation of the keyboard 4 and digitizer 9 in the main body enclosure 2 and the display screen 6 in the display panel 3 can be selectively changed by rotating the main body enclosure 2 and/or the display panel 3 about axes $T_2$ and $T_1$ as discussed above.

It is to be understood that the hinge assemblies that are schematically illustrated in FIGS. 6A-9 are merely non-limiting examples of hinge assemblies that could be used according to the present invention. Other hinge assemblies that will allow the personal notebook computer to be positioned/configured into any of the positions/configurations shown and discussed above in reference to FIGS. 1-5 that will become apparent to those skilled in the art based upon the disclosure and description herein are within the scope of the present invention.

It is again noted that while present invention has been described above with specific reference to the personal notebook computer shown in the drawings, the present invention is not so limited to a personal notebook computer, but encompasses all types of computers, personal digital assistants, wireless phones, digital cameras, hand held video and computer games and gaming devices, or the like that have structures that are foldable by means of hinged assemblies.

It is also noted that in further embodiments of the present invention the display screen 6 could have an additional digitizer overlaid therewith for inputting data into the processor of the electronic device.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and as set forth in the attached claims.

What is claimed is:

1. An electronic apparatus comprising:
   a display panel having opposite side edges and opposite sides with a display screen provided on one side;
   a main body enclosure having opposite side edges and opposite sides with a key-based input provided on one side and a keyless user interface provided on an opposite side; and
   a hinge assembly which allows the main body enclosure and the display panel to pivot together about an angle of up to substantially 360° about a common or parallel pivot axes and which hinge assembly further allows the main body enclosure to twist or rotate with respect to the display panel about an axis that extends through a center of the main body enclosure and is parallel to the opposite side edges of the main body closure and intersects or bisects the common or parallel pivot axes about which the main body enclosure and the display panel to pivot.

2. An electronic apparatus according to claim 1, wherein the hinge assembly further allows the display panel to twist or rotate with respect to the main body enclosure about an axis that extends through a center of the display panel and is parallel to the opposite side edges of the display panel and intersects or bisects the common or parallel pivot axes about which the main body enclosure and the display panel to pivot.

3. An electronic apparatus according to claim 2, wherein the keyless user interface comprises a digitizer.

4. An electronic apparatus according to claim 2, wherein the electronic apparatus comprises a computer.

5. An electronic apparatus according to claim 2, wherein the electronic apparatus comprises a personal digital assistant.

6. An electronic apparatus according to claim 2, wherein the electronic apparatus comprises a wireless phone.

7. An electronic apparatus according to claim 2, wherein the electronic apparatus comprises a camera.

8. An electronic apparatus according to claim 2, further comprising a digitizer that overlays the display screen.

9. An electronic apparatus according to claim 1, wherein the keyless user interface comprises a digitizer.

10. An electronic apparatus according to claim 1, wherein the electronic apparatus comprises a computer.

11. An electronic apparatus according to claim 1, wherein the electronic apparatus comprises a personal digital assistant.

12. An electronic apparatus according to claim 1, wherein the electronic apparatus comprises a wireless phone.

13. An electronic apparatus according to claim 1, wherein the electronic apparatus comprises a camera.

14. An electronic apparatus according to claim 1, further comprising a digitizer that overlays the display screen.

15. The electronic apparatus according to claim 1, wherein the hinge assembly is further configured to allow the display panel to twist or rotate with respect to the main body enclosure about an axis that extends through a center of the display panel and is parallel to the opposite side edges of the display panel and intersects or bisects the common or parallel pivot axes about which the main body enclosure and the display panel to pivot.

16. An electronic apparatus according to claim 15, wherein the keyless user interface comprises a digitizer.

17. An electronic apparatus according to claim 15, wherein the electronic apparatus comprises one of a computer, a personal digital assistant, a wireless phone, a digital camera and a hand held video or computer gaining device.

18. In an electronic apparatus having a display panel having opposite side edges and opposite sides with a display screen provided on one side, a main body enclosure having opposite side edges and opposite sides with a key-based input provided on one side and a keyless user interface provided on an opposite side and a hinge assembly coupling the display panel and main body enclosure together, the improvement wherein the hinge assembly is configured to allow the main body enclosure and the display panel to pivot together about an angle of up to substantially 360° about a common or parallel pivot axes and to further allow the main body enclosure to twist or rotate with respect to the display panel about an axis that extends through a center of the main body enclosure and is parallel to the opposite side edges of the main body closure and intersects or bisects the common or parallel pivot axes about which the main body enclosure and the display panel to pivot.

19. An electronic apparatus according to claim 18, wherein the keyless user interface comprises a digitizer.

20. An electronic apparatus according to claim 18, wherein the electronic apparatus comprises one of a computer, a personal digital assistant, a wireless phone, a digital camera and a hand held video or computer gaming device.

* * * * *